US011962001B2

United States Patent
Oh et al.

(10) Patent No.: US 11,962,001 B2
(45) Date of Patent: Apr. 16, 2024

(54) POSITIVE ELECTRODE MATERIAL FOR LITHIUM SECONDARY BATTERY AND LITHIUM SECONDARY BATTERY INCLUDING SAME

(71) Applicants: Hyundai Motor Company, Seoul (KR); Kia Corporation, Seoul (KR); Industry Academy Cooperation Foundation of Sejong University, Seoul (KR)

(72) Inventors: Seung Min Oh, Incheon (KR); Jun Ki Rhee, Gyeonggi-do (KR); Yoon Sung Lee, Gyeonggi-do (KR); Ji Eun Lee, Gyeonggi-do (KR); Sung Ho Ban, Gyeonggi-do (KR); Ko Eun Kim, Chungcheongbuk-do (KR); Woo Young Jin, Busan (KR); Sang Mok Park, Gyeonggi-do (KR); Sang Hun Lee, Gyeonggi-do (KR); Seung Taek Myung, Seoul (KR); Hee Jae Kim, Seoul (KR); Min Young Shin, Seoul (KR)

(73) Assignees: Hyundai Motor Company, Seoul (KR); Kia Corporation, Seoul (KR); Industry Academy Cooperation Foundation of Sejong University, Seoul (KR)

( * ) Notice: Subject to any disclaimer, the term of this patent is extended or adjusted under 35 U.S.C. 154(b) by 171 days.

(21) Appl. No.: 17/495,314

(22) Filed: Oct. 6, 2021

(65) Prior Publication Data
US 2022/0310990 A1 Sep. 29, 2022

(30) Foreign Application Priority Data
Mar. 24, 2021 (KR) .................. 10-2021-0038205

(51) Int. Cl.
*H01M 4/36* (2006.01)
*H01M 4/02* (2006.01)
(Continued)

(52) U.S. Cl.
CPC .......... *H01M 4/366* (2013.01); *H01M 4/505* (2013.01); *H01M 4/62* (2013.01); *H01M 10/0525* (2013.01); *H01M 2004/028* (2013.01)

(58) Field of Classification Search
CPC .......... H01M 4/505; H01M 2004/028; H01M 4/0471; H01M 10/0525; H01M 4/485; H01M 4/366; H01M 4/50; H01M 4/62
See application file for complete search history.

(56) References Cited

U.S. PATENT DOCUMENTS

2020/0168905 A1* 5/2020 Oh et al. ............... H01M 4/505

FOREIGN PATENT DOCUMENTS

| CN | 108091852 A | * | 9/2020 | ............ H01M 4/366 |
| CN | 113078316 A | * | 3/2021 | ............ H01M 4/366 |

(Continued)

OTHER PUBLICATIONS

Tabuchi, Mitsuharu; Nabeshima, Yoko et. al., Synthesis of high-capacity Ti- and/or Fe-substituted Li2MnO3 positive electrode materials with high initial cycle efficiency by application of the carbothermal reduction method, 2013, J. of Power Sources, 221 (2013) 427-434 (Year: 2013).*

(Continued)

*Primary Examiner* — Jonathan G Leong
*Assistant Examiner* — Kan Luo (57) ABSTRACT

Disclosed is a positive electrode material for a lithium secondary battery. The positive electrode material includes a positive electrode active material formed of Li—[Mn—Ti]-M-O-based material including a transition metal (M) to enable reversible intercalation and deintercalation of lithium (Continued)

[EXAMPLE 2]

and molybdenum oxide. The positive electrode active material is coated with the molybdenum oxide to form a coating layer on a surface thereof.

5 Claims, 10 Drawing Sheets

(51) Int. Cl.
    *H01M 4/505*     (2010.01)
    *H01M 4/62*     (2006.01)
    *H01M 10/0525*     (2010.01)

(56) References Cited

FOREIGN PATENT DOCUMENTS

| KR | 2014-0089851 A | | 7/2014 | | |
|---|---|---|---|---|---|
| KR | 20190083701 A | * | 7/2019 | ............ | H01M 4/366 |

OTHER PUBLICATIONS

Yabuuchi, Naoaki; Nakayama, Masanobu et. al., Origin of Stabilization and Destabilization in Solid-State Redox Reaction of Oxide Ions for Lithium-Ion Batteries, Dec. 23, 2016, Nature Communications, 7:13814, DOI: 10.1038/ncomms13814 (Year: 2016).*
CN108091852 A Espacenet Translation, Tan, Qiangqiang; Xia, Qing (Year: 2018).*
CN113078316 A Google Translation, Wang, Liping; Luo,Chun; Niu, Xiaobin (Year: 2021).*
Julien; Stoynov, Materials for Lithium-Ion Batteries, 2000, Springer-Science+Business Media Dordrecht, 1st Edition, 2000, p. 1 (Year: 2000).*
Hwang, KR 20190083701 A, EPO machine translation, 2019 (Year: 2019).*

* cited by examiner

FIG. 1A

[COMPARATIVE EXAMPLE 1]

FIG. 1B

[COMPARATIVE EXAMPLE 1]

FIG. 2A

[EXAMPLE 1]

FIG. 2B

[EXAMPLE 1]

FIG. 3A

[EXAMPLE 2]

FIG. 3B

[EXAMPLE 2]

FIG. 4A

[EXAMPLE 3]

FIG. 4B

[EXAMPLE 3]

FIG. 5A

[EXAMPLE 4]

FIG. 5B

[EXAMPLE 4]

POSITIVE ELECTRODE MATERIAL FOR LITHIUM SECONDARY BATTERY AND LITHIUM SECONDARY BATTERY INCLUDING SAME

CROSS REFERENCE TO RELATED APPLICATION

The present application claims priority to Korean Patent Application No. 10-2021-0038205, filed Mar. 24, 2021 the entire contents of which is incorporated herein for all purposes by this reference.

TECHNICAL FIELD

The present invention relates to a positive electrode material for a lithium secondary battery and a lithium secondary battery including the same. The positive electrode material may include a positive electrode active material having a high energy density.

BACKGROUND

A secondary battery has been used as high-performance energy source for an electric car, a bulk power storage battery, such as a battery energy storage system, and small portable electric devices, such as a cellular phone, a camcorder, and a laptop computer. Thus, research for reducing weight of a part and electric consumption and improving a secondary battery with reduced size and greater capacity components has been conducted in order to implement the miniaturization and the continuous use of a portable electric device.

For example, a lithium ion battery as a representative secondary battery can provide greater energy density and greater capacitance per unit area than a nickel-manganese battery or a nickel-cadmium battery. In addition, the lithium ion battery can have reduced self-discharge rate and an extended life. Furthermore, the lithium ion battery does not have a memory effect, and thus, may provide convenience of use and extended life span.

A lithium secondary battery generates electricity through oxidation/reduction reactions of lithium ions which are intercalated/deintercalated in a positive electrode and a negative electrode in a state where an electrolyte fills a region between the positive electrode and the negative electrode, each including an active material enabling intercalation and deintercalation of lithium ions.

This lithium secondary battery is formed of a positive electrode material, an electrolyte, a separator, a negative electrode, and so on, and it is very important to maintain stable interfacial reactions between components so as to secure a long life and a reliability of the lithium secondary battery.

As such, research on improving a positive electrode material is ongoing to enhance the performance of the lithium secondary battery. Although a number of studies have been conducted to develop a lithium secondary battery having high-performance and high stability, frequent explosion accidents of lithium secondary batteries have occurred recently, and safety problems have been raised.

The information disclosed in this section is merely for enhancement of understanding of the general background of the present invention and should not be taken as an acknowledgement or any form of suggestion that this information forms the related art already known to a person skilled in the art.

SUMMARY OF THE INVENTION

In preferred aspects, provided is a positive electrode material for a lithium secondary battery that can provide a higher discharge capacity than an existing positive electrode by being coated with transition metal and without using Ni and Co, and to provide a lithium secondary battery including the positive electrode material.

In an aspect, provided is a positive electrode material that may include a positive electrode active material formed of Li—[Mn—Ti]-M-O-based material including a transition metal (M) to enable reversible intercalation and deintercalation of lithium, and molybdenum oxide. In particular, the positive electrode active material may be coated with molybdenum oxide to form a coating layer on a surface thereof.

The positive electrode active material may suitably include $Li_{1.25+y}[Mn_{0.45}Ti_{0.35}]_{0.975}M_{0.025}O_2$ and the coating layer may suitably include $Li_xMoO_z$, and x, y, and z may satisfy numerical ranges of $0 \leq x \leq 6$, $-0.02 \leq y \leq 0.02$, and $2 \leq z \leq 4$.

A weight of the coating layer may suitably be about 0.1 wt % to 20 wt % based on a weight of the positive electrode active material.

A weight of the coating layer may suitably be about 1 wt % to 10 wt % based on a weight of the positive electrode active material.

The transition metal (M) may be selected from the group consisting of W, Cr, Al, Ni, Fe, Co, V, and Zn.

Also provided is a lithium secondary battery that may include: a positive electrode active material formed of Li—[Mn—Ti]-M-O-based material including a transition metal (M) to enable reversible intercalation and deintercalation of lithium; negative electrode including a negative electrode active material; a separator interposed between the positive electrode and the negative electrode; and an electrolyte.

According to various exemplary embodiments of the present invention, a positive electrode material that can provide a higher discharge capacity than that of an existing positive electrode without using Ni and Co may be formed, and an effect of realizing a positive electrode material having a high energy density can be expected by using the present invention.

Further provided are vehicles that comprise an electrode and/or battery as disclosed herein.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

In particular aspects, electric-powered or hybrid vehicles are provided that comprise an electrode and/or battery as disclosed herein.

Other aspects are disclosed infra.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION

Hereinafter, specific embodiments will be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless otherwise indicated, all numbers, values, and/or expressions referring to quantities of ingredients, reaction conditions, polymer compositions, and formulations used herein are to be understood as modified in all instances by the term "about" as such numbers are inherently approximations that are reflective of, among other things, the various uncertainties of measurement encountered in obtaining such values.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

In the related art, to improve a capacity of a lithium secondary battery, a NCM-based material has been commonly used as a positive electrode active material. Particularly, in the NCM-based material, a theoretical capacity of a lithium secondary battery increases as a proportion of Ni becomes larger. However, Ni eluted on a surface of a positive electrode active material increases as the proportion of Ni becomes larger, and Ni ions cause a side reaction on the surface of the positive electrode active material due to a high reactivity thereof, so that there is a problem in that a deterioration of the lithium secondary battery rapidly proceeds when charging and discharging of the lithium secondary battery is repeated.

To solve this problem, in the present invention, a positive electrode material that is possible to realize a higher capacity than a positive electrode material using Ni and Co was synthesized without using Ni and Co. In one aspect, the positive electrode active material may be synthesized by coating molybdenum oxide on a positive electrode active material formed of Li—[Mn—Ti]-M-O-based material including a transition metal (M).

The positive electrode active material may suitably include $Li_{1.25+y}[Mn_{0.45}Ti_{0.35}]_{1975}M_{0.025}O_2$ and a coating layer may suitably include $Li_xMoO_z$, in which x, y, and z are satisfying numerical ranges of $0 \leq x \leq 6$, $-0.02 \leq y \leq 0.02$, and $2 \leq z \leq 4$.

In compositions indicated as $Li_{1.25+y}[Mn_{0.45}Ti_{0.35}]_{1975}M_{0.025}O_2$, if the atomic ratio or the molar ratio, that is, x, y, and z are outside the numerical ranges, a lot of impurities are generated due to an excessive amount of Li, and a Li dendrite may be formed.

$(NH_4)_6Mo_7O_{24}$-$4(H_2O)$ may suitably be used when the coating layer is formed on the surface of the positive electrode active material, and may react with residual lithium on the surface of the positive electrode active material, so that the coating layer formed of lithium molybdenum oxide as described above is formed.

At this time, a transition metal (M) forming the positive electrode active material may be any one of W, Cr, Al, Ni, Fe, Co, V, and Zn. Considering an oxidation number, when a transition metal having +1 oxidation number is included in a positive electrode active material, the amount of Li increases, so that there is a problem in that it is difficult to form a single phase structure due to excessive amount of Li. Moreover, a transition metal having an oxidation number greater than +6 makes a positive electrode active material to be unstable, so that the transition metal having an oxidation number greater than +6 may be preferable to be excluded.

Further, in one aspect, a lithium secondary battery may include: a positive electrode active material formed of Li—[Mn—Ti]-M-O-based material including a transition metal (M) so as to enable reversible intercalation and deintercalation of lithium; negative electrode including a negative electrode active material; a separator interposed between the positive electrode and the negative electrode; and an electrolyte.

EXAMPLE

Hereinafter, by manufacturing a lithium secondary battery using the positive electrode material, evaluations of electrochemical performance will be described.

[Example 1]

$Li_2CO_3$ (4.2341 g added), $Mn_2O_3$ (3.2086 g added and synthesized by calcinating $MnCO_3$), $TiO_2$ (2.5387 g added), $Al_2O_3$ (0.11883 g added) were mixed with anhydrous ethanol solvent in an 80 ml capacity of jar. At this time, a molar ratio of each component was adjusted to $Li_{1.25}[(Mn_{0.45}Ti_{0.35})_{0.975}Al_{0.025}]O_2$ composition. At this time, $ZrO_2$ balls with 10 mm×10 g, 5 mm×20 g, and 1 mm×8 g were added. The ball milling condition was 300 rpm/5 h and performed in 17 sets of 15 minutes each. After the ball milling, the positive electrode active materials were washed with ethanol, dried, and pelletized. Then, the positive electrode active materials were subject to calcination in the Ar atmosphere at a temperature of 900° C. for 12 hours, to thereby obtain positive electrode active material powder.

Then, for a surface modification, 2.5 wt % of $(NH_4)_6Mo_7O_{24}\cdot4(H_2O)$ material compared to the positive electrode active material was mixed with the obtained positive electrode active material powder, and then heat-treatment in the $Ar/H_2$ atmosphere at a temperature of 300° C. for 4 hours was performed.

Then, a primary carbon ball milling (300 rpm/6 h, 20 sets of 15 minutes each) [active material: Acetylene black=9 wt %: 1 wt %, $ZrO_2$ Ball: 10 mm×10 g, 5 mm×20 g, 1 mm×4 g] was performed, and a secondary carbon ball milling (300 rpm/12 h, 40 sets of 15 minutes each) [$ZrO_2$ Ball: 1 mm×11 g] were performed.

The coating layer was set to be 2.5 wt % based on the total weight of positive electrode active material.

[Example 2]

The same procedure as in Example 1 was performed, except that a ratio of $(NH_4)_6Mo_7O_{24}\cdot4(H_2O)$ was changed to 0.01 wt %. The coating layer was set to be 1.0 wt % based on the total weight of the positive electrode active material.

[Example 3]

The same procedure as in Example 1 was performed, except that a ratio of $(NH_4)_6Mo_7O_{24}\cdot4(H_2O)$ was changed to 0.05 wt %. The coating layer was set to be 5.0 wt % based on the total weight of the positive electrode active material.

[Example 4]

The same procedure as in Example 1 was performed, except that a ratio of $(NH_4)_6Mo_7O_{24}\cdot4(H_2O)$ was changed to 0.1 wt %. The coating layer was set to be 10.0 wt % based on the total weight of the positive electrode active material.

[Comparative Example 1]

The same procedure as in Example 1 was performed, except that $(NH_4)_6Mo_7O_{24}\cdot4(H_2O)$ was not used, and finished by carbon-coating the manufactured powder.

The positive electrode active material synthesized in Example 1 to Comparative Example 1 was mixed with a conductive material and a binder, and a slurry was prepared by mixing with an NMP solvent Acetylene black was used as a conductive material and polyvinylidene difluoride (PVDF) was used as a binder. The mixing ratio of the positive electrode active material, the conductive material, and the binder was 85:5:10.45 μL of the NMP solvent was injected based on the total material 0.1 g.

After 10 minutes mixing, coated to have a thickness of 50 μm, and then vacuum-dried at a temperature of 110° C. The loading amount of the electrode was set to 1 mg based on 10 Ø.

A polyethylene (PE) separator was used when the battery was manufactured, and 1 M $LiPF_6$ in an organic solvent that is mixed with a volumetric ratio of EC:EMC=30:70 was used as a lithium salt that is an electrolyte. Graphite was used as the negative electrode material. A coin cell was manufactured, and the electrochemical performance test was performed.

Lithium Secondary Battery Charge-Discharge Performance Test

Each of FIG. 1A, FIG. 2A, FIG. 3A, FIG. 4A, and FIG. 5A is a graph illustrating a result of a lithium secondary battery charge-discharge performance test according to Comparative Example 1, Example 1, Example 2, Example 3, and Example 4, respectively. The discharge end voltage and the charge end voltage were set to 2.5 V and 4.5 V, respectively, and the curbing rate was separated into 0.03 C and 0.5 C and the initial charge-discharge performance was tested.

Particularly, the charge-discharge performance of Example 1 and Example 2 was found to be a value exceeding the charge-discharge performance of Comparative Example 1, and the charge-discharge performance of Example 3 and Example 4 was found to be at the same level as that of Comparative Example 1. It is preferable that the weight of the coating layer is 1 to 2.5 wt % based on the weight of the positive electrode active material.

Lithium Secondary Battery High-Temperature Cycle-Life Characteristics Test

Each of FIG. 1B, FIG. 2B, FIG. 3B, FIG. 4B, and FIG. 5B is a graph illustrating a result of a lithium secondary battery high-temperature cycle-life characteristics test according to Comparative Example 1, Example 1, Example 2, Example 3, and Example 4, respectively. The discharge end voltage and the charge end voltage were set to 2.5 V and 4.5 V, respectively, and the charge-discharge temperature was set to 50° C. and the curbing rate was set to 0.5 C, and then the capacity retention ratio at the 50th cycle was measured.

Figure 1A:
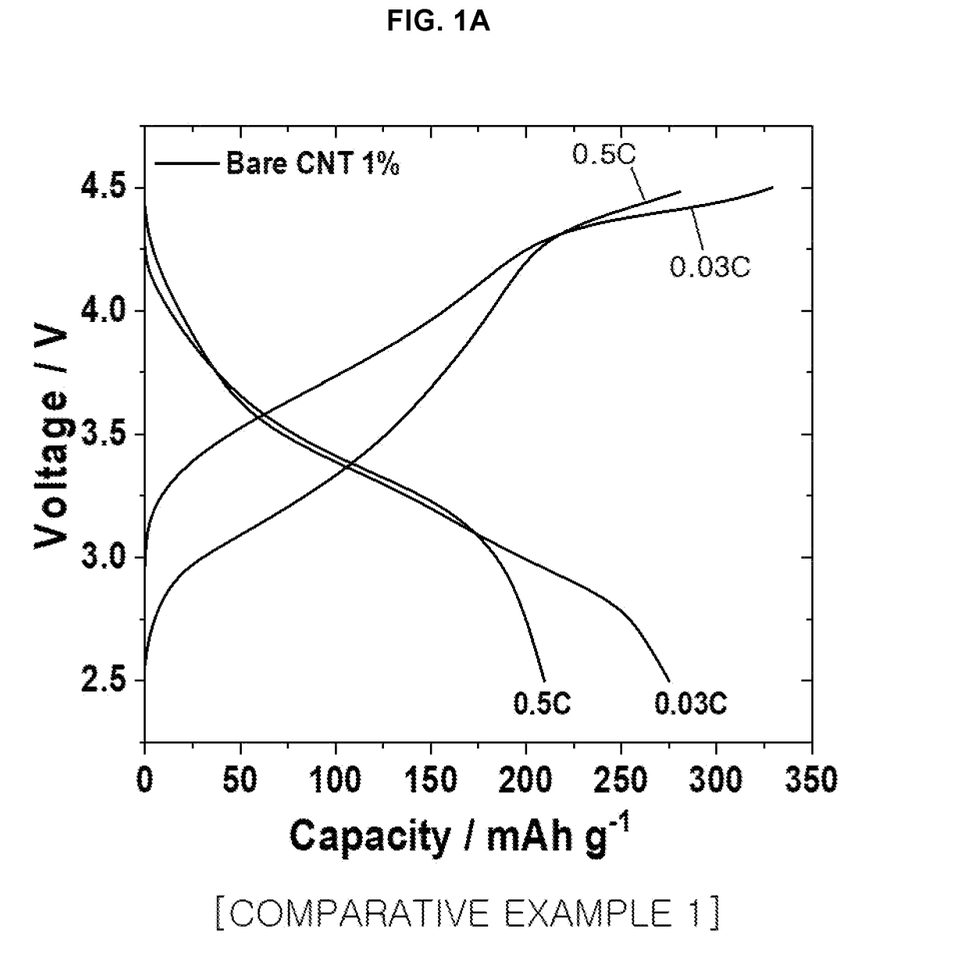
FIGS. 1A and 1B are graphs illustrating results of electrochemical properties experiments of Comparative Example 1.
Figure 1B:
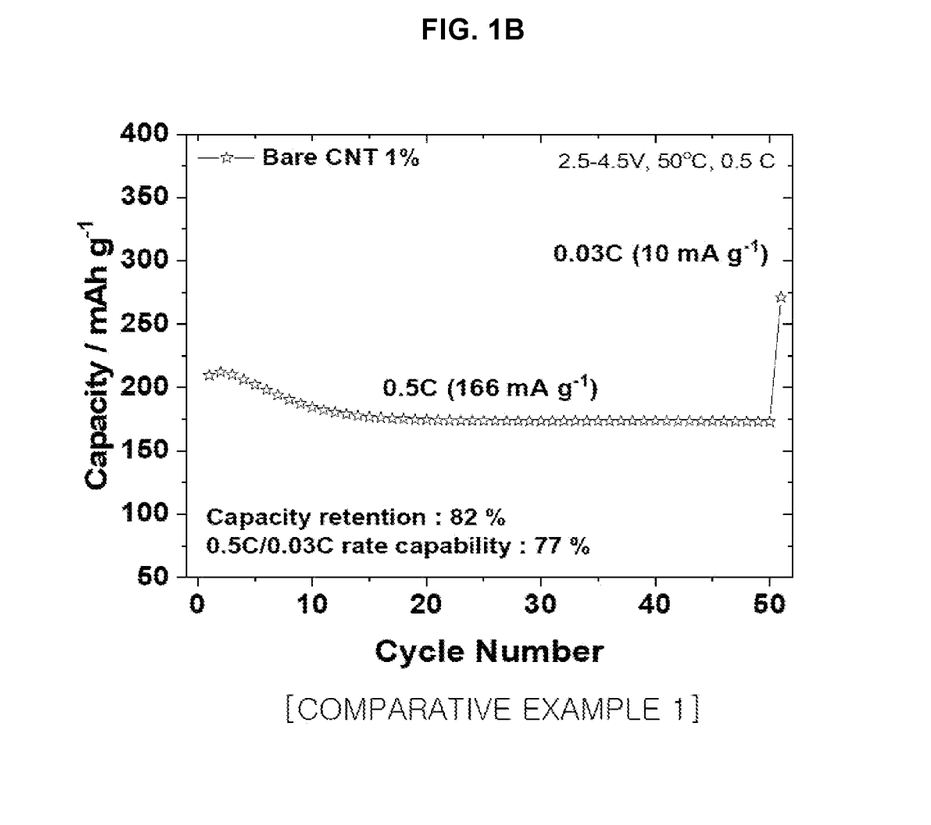
Figure 2A:
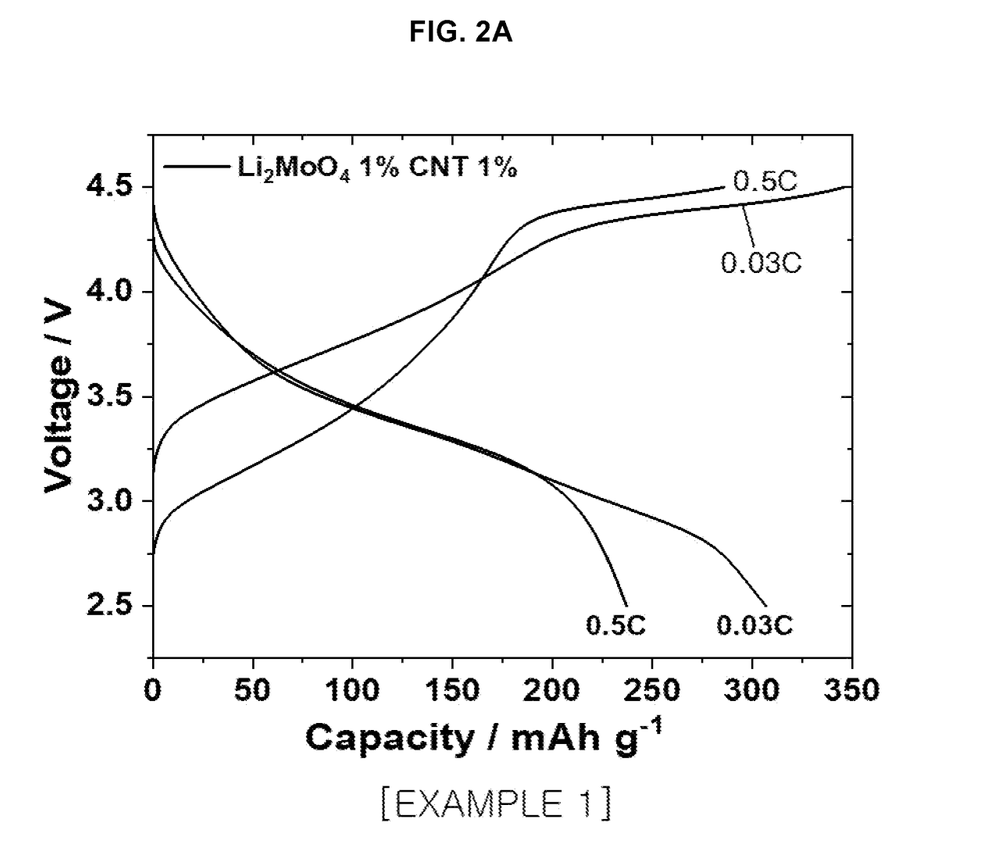
FIGS. 2A and 2B are graphs illustrating results of electrochemical properties experiments of Example 1 according to an exemplary embodiment of the present invention.
Figure 2B:
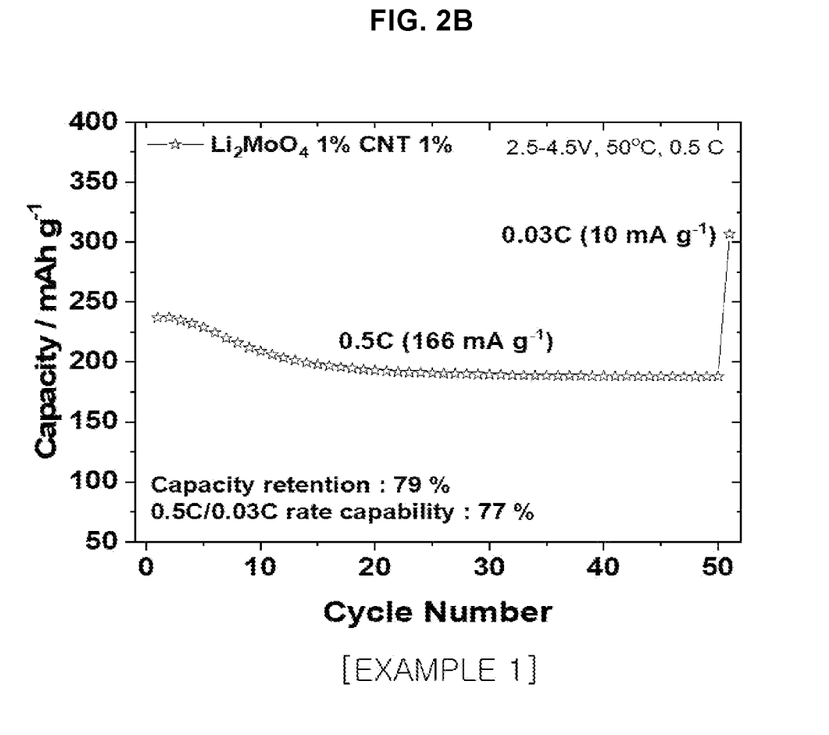
Figure 3A:
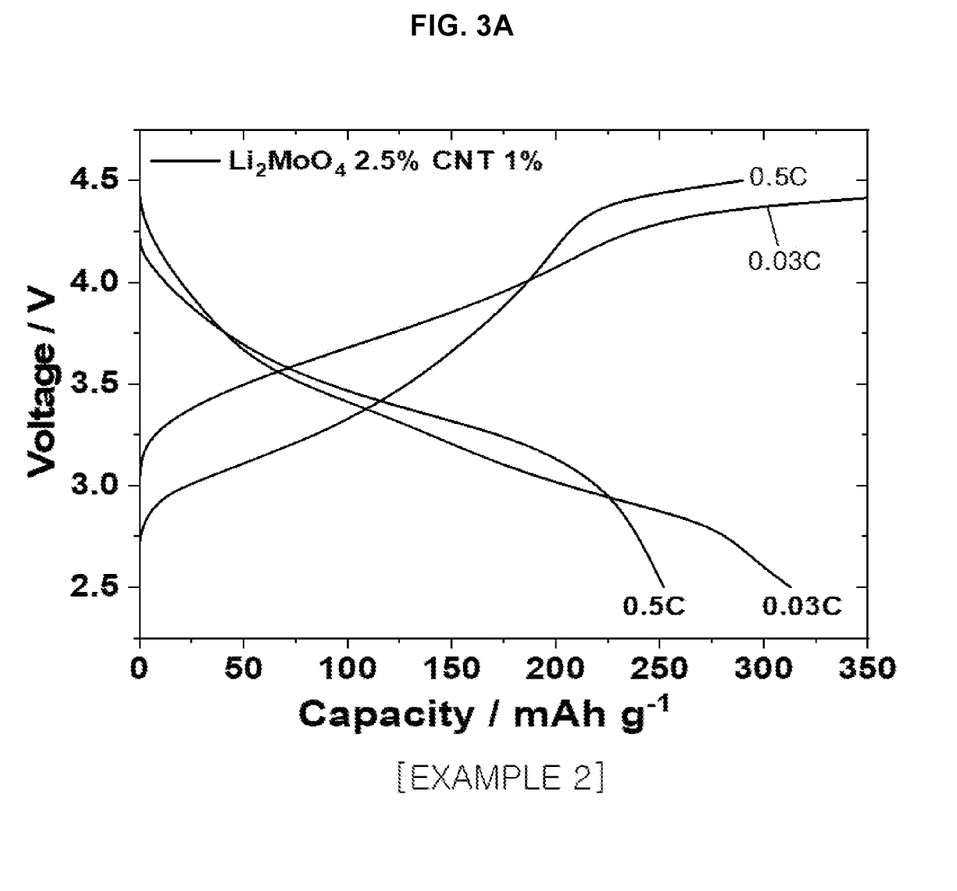
FIGS. 3A and 3B are graphs illustrating results of electrochemical properties experiments of Example 2 according to an exemplary embodiment of the present invention.
Figure 3B:
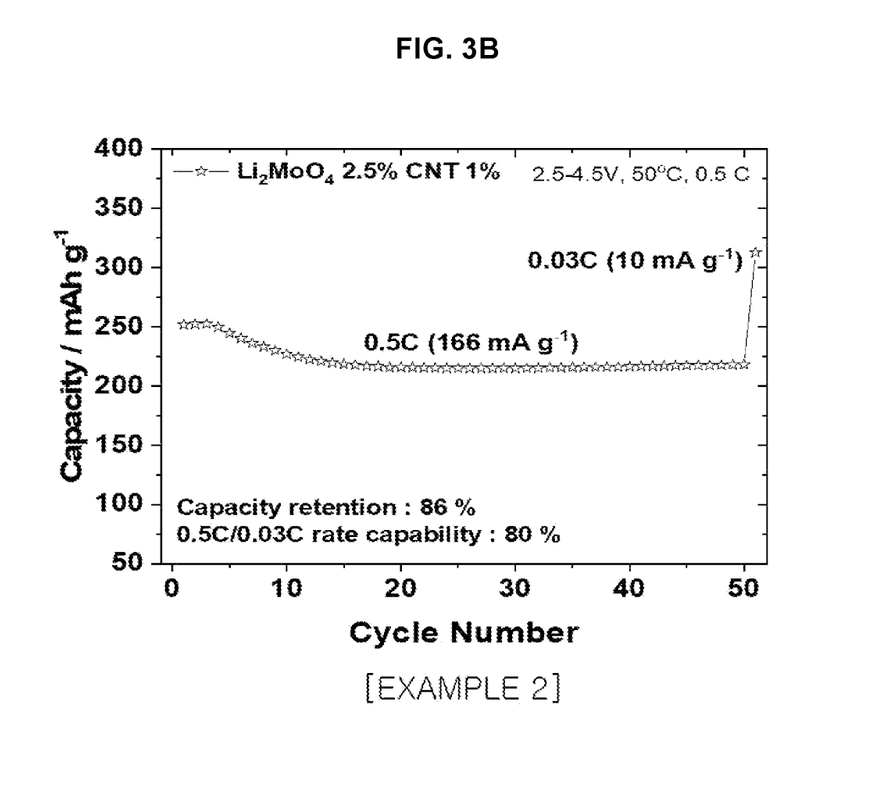
Figure 4A:
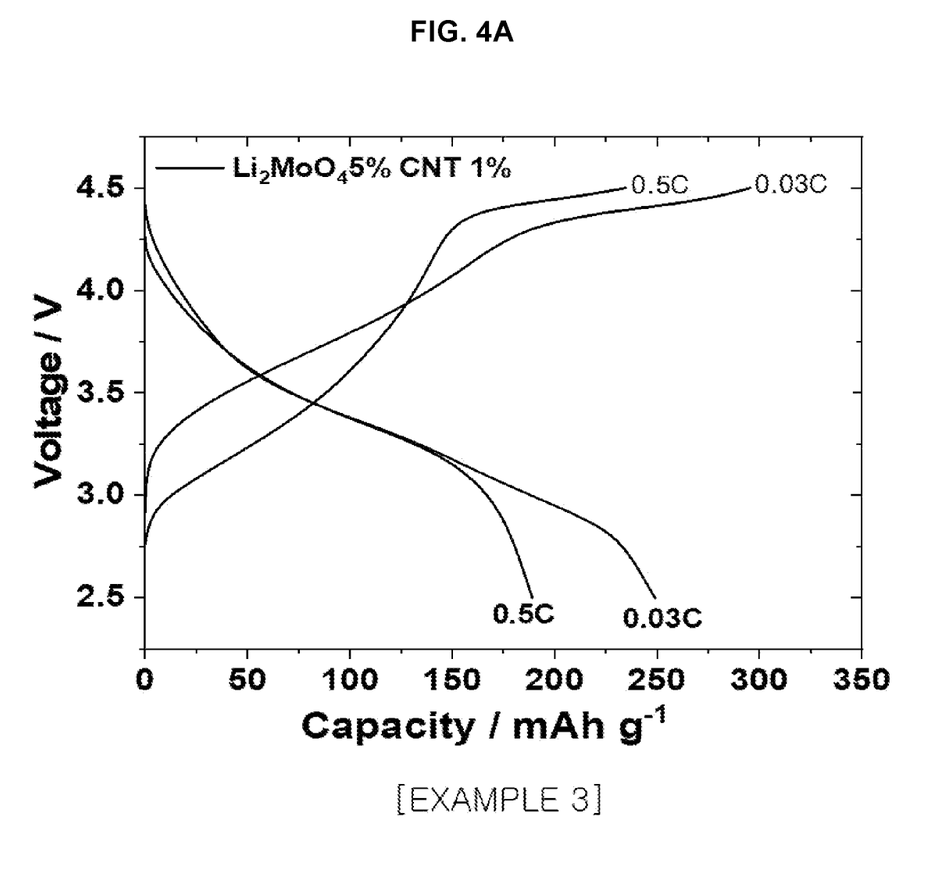
FIGS. 4A and 4B are graphs illustrating results of electrochemical properties experiments of Example 3 according to an exemplary embodiment of the present invention.
Figure 4B:
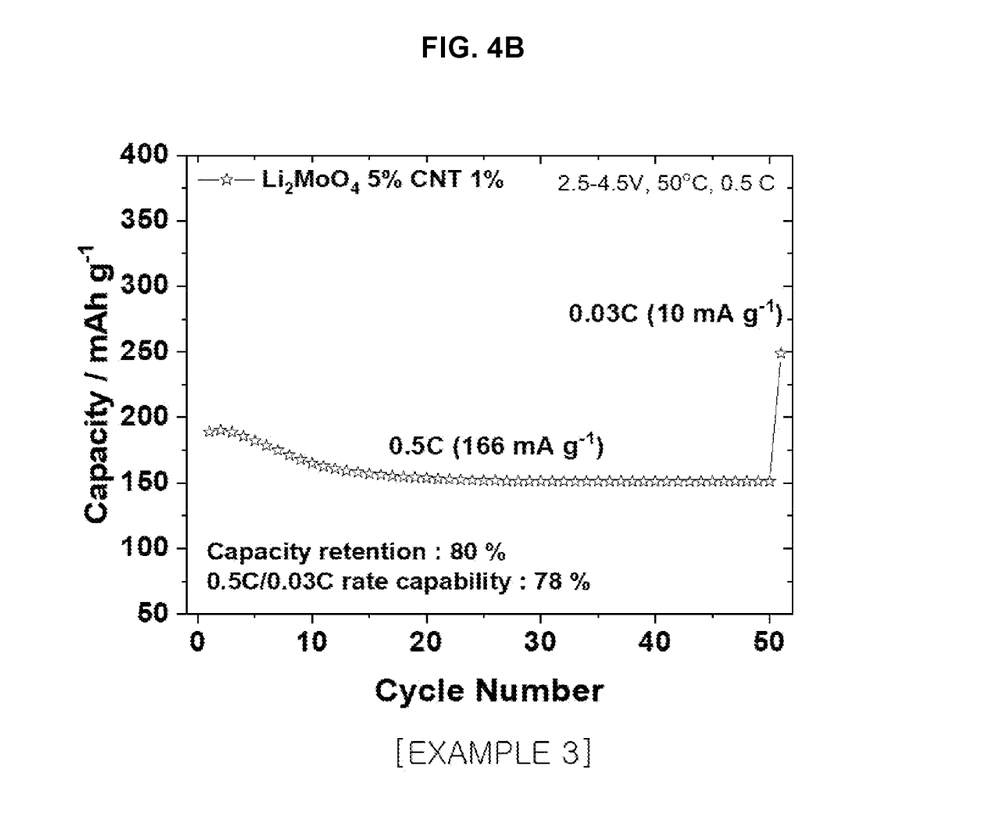
Figure 5A:
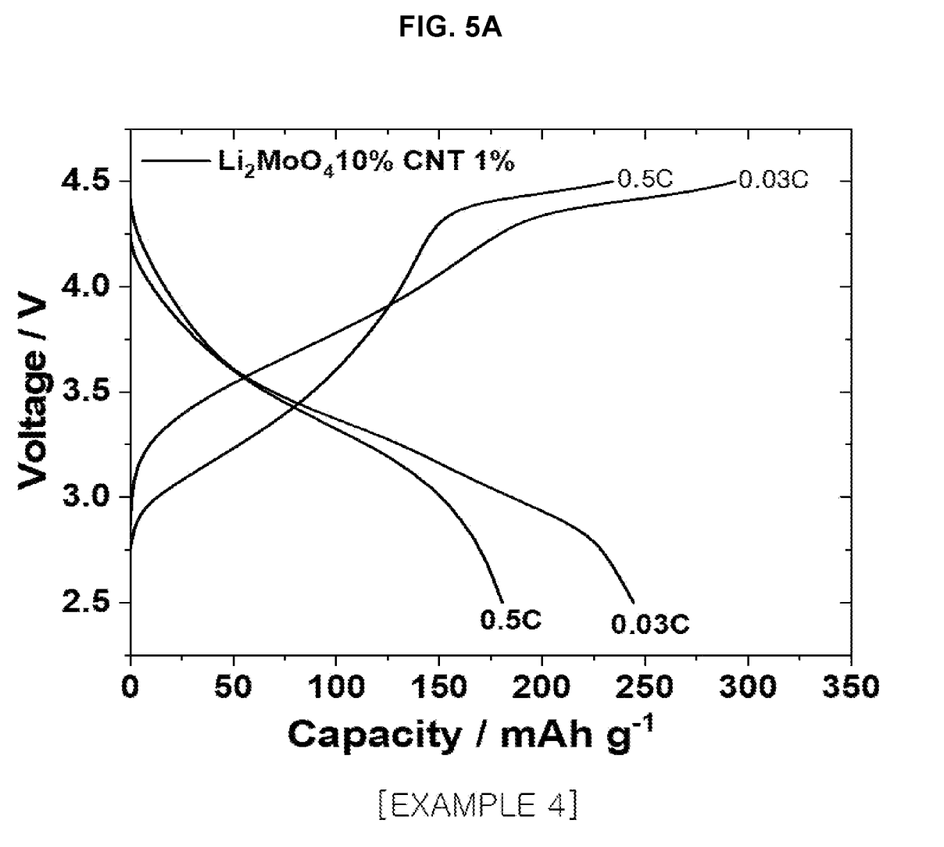
FIGS. 5A and 5B are graphs illustrating results of electrochemical properties experiments of Example 4 according to an exemplary embodiment of the present invention.
Figure 5B:
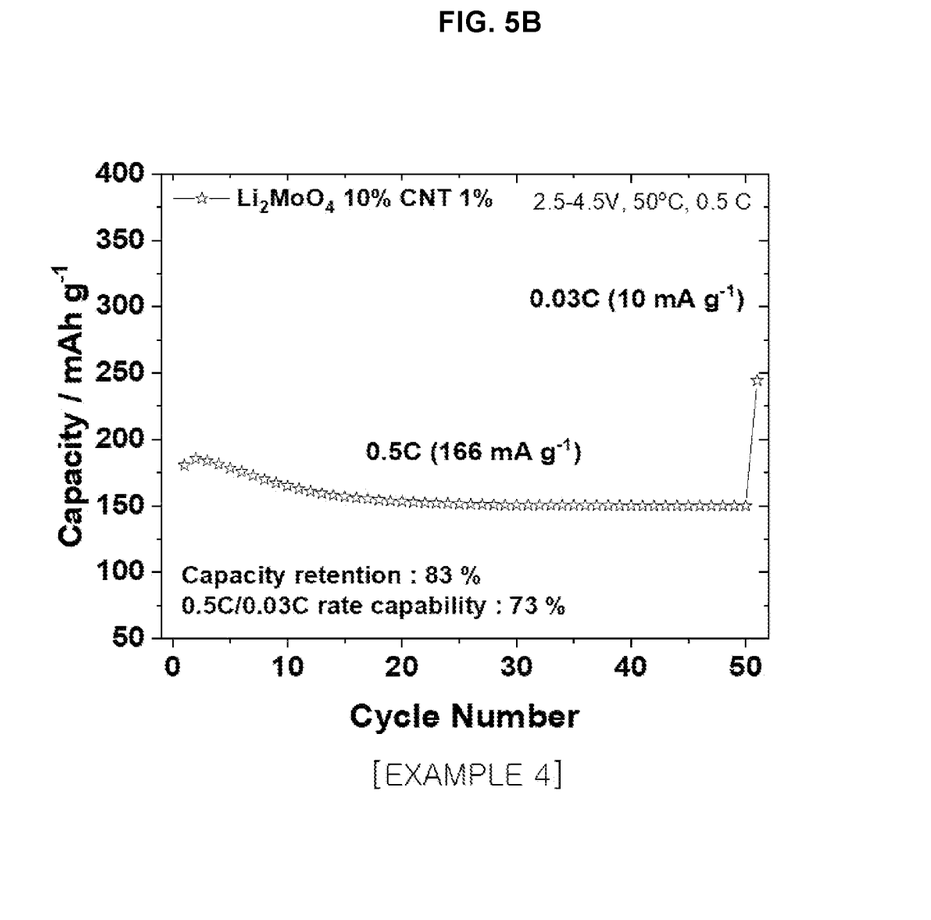

Particularly, in Example 2, it can be seen that the capacity retention ratio was 86%, which was the most excellent high-temperature cycle-life characteristics.

Although the present invention has been shown and described with respect to specific embodiments, it is apparent to those having ordinary skill in the art that the present invention may be variously modified and altered without departing from the spirit and scope of the present invention as defined by the following claims.

What is claimed is:

1. A positive electrode material for a lithium secondary battery, consisting of:
   a positive electrode active material formed of Li—[Mn—Ti]-M-O-based material comprising a transition metal (M) to enable reversible intercalation and deintercalation of lithium, and
   a coating layer comprising molybdenum oxide is formed on the positive electrode active material,
   wherein the positive electrode active material comprises $Li_{1.25+y}[Mn_{0.45}Ti_{0.35}]_{0.975}M_{0.025}O_2$ and the coating layer comprises $Li_xMoO_z$, wherein x, y, and z are satisfying numerical ranges of $0 \leq x \leq 6$, $-0.02 \leq y \leq 0.02$, and $2 \leq z \leq 4$,
   wherein the transition metal (M) is selected from the group consisting of W, Cr, Al, Ni, Co, V, and Zn.

2. The positive electrode material of claim 1, wherein a weight of the coating layer is about 0.1 wt % to 20 wt % based on a weight of the positive electrode active material.

3. The positive electrode material of claim 1, wherein a weight of the coating layer is about 1 wt % to 10 wt % based on a weight of the positive electrode active material.

4. A lithium secondary battery comprising:
a positive electrode comprising the positive electrode material consisting of the positive electrode active material and the coating layer of claim 1;
a negative electrode comprising a negative electrode active material;
a separator interposed between the positive electrode and the negative electrode; and
an electrolyte.

5. A vehicle comprising a battery of claim 4.

* * * * *